March 2, 1926.                                                      1,574,829
M. C. LYSTAD
CHILD'S VEHICLE
Filed April 30, 1925
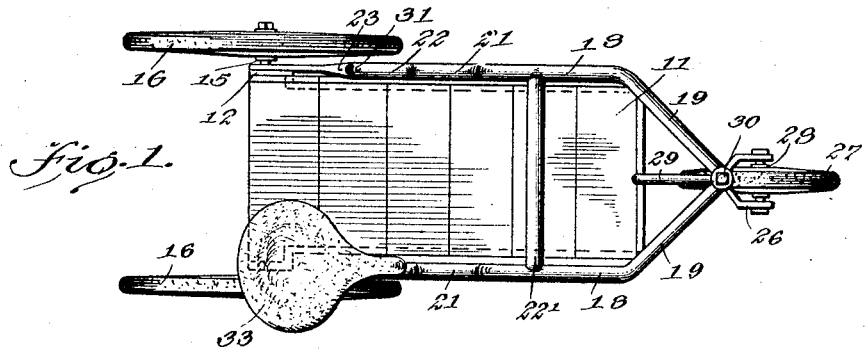
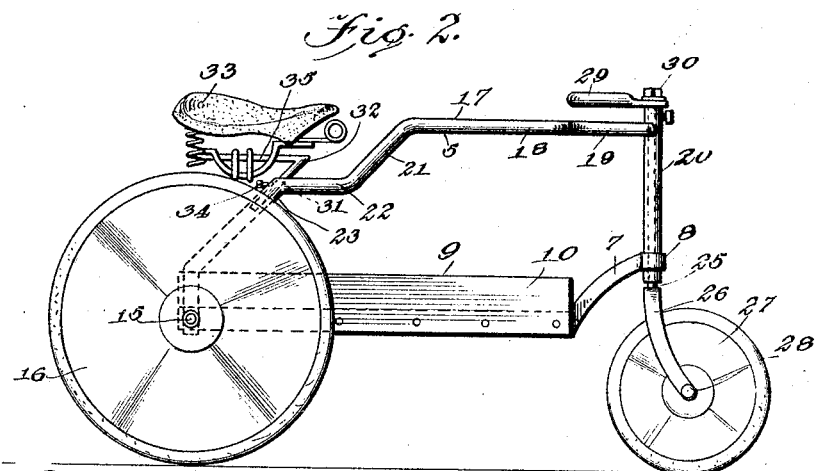
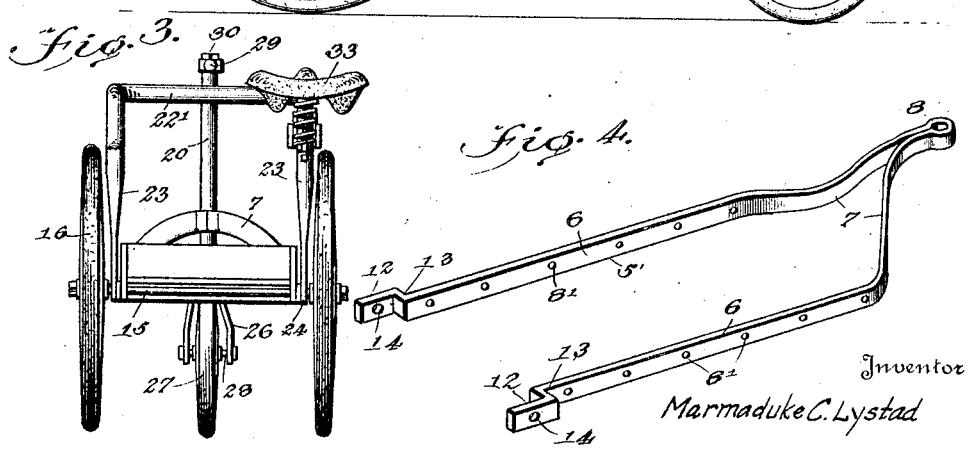
Inventor
Marmaduke C. Lystad
By
Attorney Patented Mar. 2, 1926.

1,574,829

UNITED STATES PATENT OFFICE.

MARMADUKE C. LYSTAD, OF CHICAGO, ILLINOIS.

CHILD'S VEHICLE.

Application filed April 30, 1925. Serial No. 26,999.

*To all whom it may concern:*

Be it known that I, MARMADUKE C. LYSTAD, citizen of the United States, residing at Chicago, in the county of Cook and State of Illinois, have invented certain new and useful Improvements in Children's Vehicles, of which the following is a specification.

My invention relates to improvements in children's vehicles and particularly to the type propelled by the occupant.

It is an object of the invention to provide a vehicle having a seat for supporting the operator, which is so arranged that one of the operator's legs will be free to engage the ground to propel the vehicle.

A further object of the invention is to provide a vehicle which is simple and durable in construction, composed of a few parts and inexpensive to manufacture.

Other objects and advantages of the invention will be apparent during the course of the following description.

In the accompanying drawing, forming a part of this specification and in which like numerals are employed to designate like parts throughout the same, Fig. 1, is a top plan view of my invention, Fig. 2, is a side elevation of the same, Fig. 3, is a rear view of the same, and, Fig. 4, is a perspective view of the lower frame.

In the drawing, wherein for the purpose of illustration I have shown a preferred embodiment of my invention, the frame of the vehicle is generally denoted by the numeral 5, and includes a lower frame 5' consisting of spaced parallel side bars 6 connected at their forward end by the upwardly curved converging arms 7 which merge together and are shaped to form a collar 8. The side bars each have a series of spaced apertures 8' and the rectangular body 9 having sides 10 and a bottom 11 is secured between the side bars by bolts or other suitable fasteners. The rear ends 12 of the side bars, are off-set, as at 13, and have apertures 14 to receive the axle 15 on which the wheels 16 are mounted for supporting the rear end of the body.

The upper frame 17 is constructed of tubing and consists of spaced longitudinal side members 18 disposed in superposed relation to the side bars 6 of the lower frame. The forward ends 19 of the side members converge inwardly, merging together and are integrally connected with the upper end of the vertically disposed steering column 20, the lower end of which extends through the collar 8 of the lower frame. The side members 18 intermediate their ends are dropped slightly, as at 21, so the rear portions 22 are on a lower horizontal plane than the forward portions and their ends 23 are gradually sloped downwardly towards the rear ends of the lower frame having connection with the axle, as at 24. It will be observed in Fig. 3, that the rear portions 22, at their point of connection with the axle are flattened, thereby leaving sufficient clearance for the wheels. The side members 18 at their forward ends are braced by the cross bar 22' which connects the two members.

A steering rod 25 is journaled in the steering column 20 having a fork 26 formed integral with its lower end in which the front wheel 27 is mounted on the axle 28. A handle 29 is connected to the upper end of the steering rod, being secured thereon by the nut 30. Thus, it is seen that the steering of the vehicle is under the control of the operating handle.

At the point 31, where the rear portions of the side members 18 are inclined downwardly, the tubing is provided with an opening to receive the stem 32 of the saddle 33, which is adjustably mounted in the tubing by the set screw 34. The stem has a horizontal arm 35, on which the saddle 33 is mounted, the saddle employed being of the conventional type. It will be noted that only one of the side members is provided with a saddle, but in use it may be arranged so the saddle may be placed on either side of the vehicle at the desire of the user. As shown, the rear wheels are of larger diameter than the front wheel and all of the wheels are of the disc type having rubber tires mounted on their rims.

In operation, the saddle is straddled by the user and the knee of the inside leg will rest on the bottom of the body 9 and the outside leg will hang on the outside of the vehicle being free to engage the ground for imparting movement to the vehicle. Thus, it is seen that a vehicle of durable construction is provided, which is so designed and arranged as to afford easy manipulation and manual operation of the vehicle through the use of the legs.

It is to be understood that the form of my invention herewith shown and described is to be taken as a preferred example of the same and that certain changes in the shape, size and arrangement of parts may be made without departing from the spirit of the invention or the scope of the subjoined claims.

Having thus described my invention I claim:

1. A vehicle of the character described including a body, a lower frame supporting said body, wheels supporting said frame, an upper frame disposed in superposed relation to said lower frame and including a pair of parallel side members, and a seat attachable to either of said members.

2. A vehicle of the character described including a body, a lower frame supporting said body, wheels supporting said frame, an upper frame disposed in superposed relation to said lower frame, the side members of said upper frame having their rear portions on a lower plane than the forward portions and a seat mounted on the rear portion of one of said side members.

3. A vehicle of the character described including a body, a lower frame supporting said body, wheels supporting said frame, an upper frame disposed in superposed relation to said lower frame, the side members of said upper frame having their rear portions on a lower plane than the forward portions and a saddle adjustably mounted on the rear portion of one of the side members.

4. A vehicle of the character described including a body, a lower frame supporting said body, a pair of wheels supporting the rear of said frame, a steering wheel supporting the forward end of said frame, an upper frame disposed in superposed relation to said lower frame, the side members of said upper frame having their rear portions on a lower plane than the forward portions and a saddle mounted on the rear portion of one of the side members.

In testimony whereof I affix my signature.

MARMADUKE C. LYSTAD.